United States Patent [19]
Kim et al.

[11] Patent Number: 5,375,002
[45] Date of Patent: Dec. 20, 1994

[54] COLOR ERROR DIFFUSION

[75] Inventors: Seo-Kyu Kim, Kyungki-do; Yoon-Soo Kim, Seoul, both of Rep. of Korea

[73] Assignee: SamSung Electronics Co., Ltd., Suwon, Rep. of Korea

[21] Appl. No.: 157,270

[22] Filed: Nov. 26, 1993

[30] Foreign Application Priority Data

Nov. 26, 1992 [KR] Rep. of Korea ............ 1992/22453

[51] Int. Cl.⁵ .................... H04N 1/40; H04N 1/46
[52] U.S. Cl. .................. 358/521; 358/523; 358/530; 358/458; 358/460; 358/448
[58] Field of Search ............ 358/500, 504, 518, 521, 358/523, 530, 534, 406, 443, 445, 448, 455, 456, 458, 460, 298, 465, 466, 457

[56] References Cited

U.S. PATENT DOCUMENTS

| | | | |
|---|---|---|---|
| 4,876,610 | 10/1989 | Ohsawa et al. | 358/456 |
| 4,878,125 | 10/1989 | Katayama et al. | |
| 4,941,038 | 7/1990 | Walowit | |
| 5,031,050 | 7/1991 | Chan | 358/298 |
| 5,070,413 | 12/1991 | Sullivan et al. | |
| 5,111,302 | 5/1992 | Chan et al. | |
| 5,130,819 | 7/1992 | Ohta | 358/445 |
| 5,140,432 | 8/1992 | Chan | 358/298 |
| 5,157,506 | 10/1992 | Hannah | |
| 5,172,237 | 12/1992 | Blonstein et al. | |
| 5,172,247 | 12/1992 | Ghaderi | |
| 5,175,804 | 12/1992 | Wittmann | |
| 5,195,175 | 3/1993 | Kanno et al. | |
| 5,260,807 | 11/1993 | Tai | |
| 5,278,671 | 1/1994 | Takahashi et al. | 358/456 |
| 5,299,034 | 3/1994 | Kanno et al. | 358/518 |

Primary Examiner—Scott A. Rogers
Attorney, Agent, or Firm—Robert E. Bushnell

[57] ABSTRACT

An error diffusion circuit and method for adoptively compensating for the distortion of brightness and color with respect to neighboring pixels. An error diffusion circuit of a color image printer having a circuit for scanning color documents and generating C-M-Y (cyan-magenta-yellow) signals from an input pixel includes a color determining portion for adding the C-M-Y signals to a diffusion error to generate a current pixel value, comparing the current pixel value with sequentially supplied error look-up data to determine an address of error look-up data having the smallest error as output pixel color information, and applying the output pixel color information to the printer; an error storage portion for storing the smallest error out of errors calculated from the color determining portion as an error for a current pixel, reading out the stored error when a next pixel is processed, and providing the read error as neighboring pixel error information to the color determining portion so as to generate the diffusion error; a neighboring pixel color information storage portion for storing the output pixel color information as neighboring pixel color information of the next pixel; and an error look-up table storage portion for storing error values generated when printing the input pixel according to the output pixel color information and providing the error values as the error look-up data to the color determining portion.

17 Claims, 5 Drawing Sheets

| 1 | 3 | 5 | 3 | 1 |
|---|---|---|---|---|
| 3 | 5 | 7 | 5 | 3 |
| 5 | 7 | Iin | | |

COLOR ERROR DIFFUSION

BACKGROUND OF THE INVENTION

The present invention relates to color printing generally and, more particularly, to adaptive error diffusion circuits and methods in a color image processor.

Generally, when a color image is reproduced in an image processor such as a color printer, brightness and color distortion occur according to the color image processing type and the characteristics of the color printer to which the adopted type of image processing is applied. Since human eyes are very sensitive to the brightness of an image and the variation of color, distortion of brightness and color must be appropriately compensated to obtain good color printing and reproduction quality.

An error diffusion process is a known method for processing brightness and color. This process is widely used in color image printers having limited primary colors of red, green, blue, cyan, magenta and yellow, since their image reproducing capability is excellent. When a continuous gray scale image is binarized, an error is generated. The error diffusion process is a technique used to distribute the error to neighboring pixels. In consideration of this error, binarization is executed when the next pixel is processed. Consequently, spatial resolution is improved as compared with an ordered dithering process. Examples of error diffusion processes are described in further detail in an article written by Robert Ulichney entitled *Digital Halftoning* (see Chapter 8, *Dithering with blue noise*) published by MIT press, as well as in the *Method And System For Reproducing Monochromatic And Color Images Using Ordered Dither And Error Diffusion* of U.S. Pat. No. 5,031,050 and *Method And System For Printing In One Or More Color Planes With Improved Control Of Eorror Diffusion*, U.S. Pat. No. 5,140,432 issued to Chan.

In typical conventional error diffusion circuits, a video signal applied to the input terminal line is added to the output of an error diffusion filter to obtain a first value. The first value generated is applied to a threshold circuit. The output of the threshold circuit and the first value are added to generate a second value. The second value generated is the error value, this error value is applied to the error diffusion filter.

A conventional error diffusion circuit exhibits good intermediate tones in a monochromatic image. I have noticed however, that it is difficult to reproduce an original color image in an ink jet or electrophotographic type color printer because the characteristics of the printer are not considered by conventional error diffusion circuits. Consequently, I have found that with conventional circuits, the color image may be dark and discolored as a result of ink bleed and color overlap between a current pixel and one of its neighboring pixels.

Various attempts have been made to improve the error diffusion process and the overall quality of printer image reproduction. It has been my observation however, that previous attempts do not address absorption error with respect to the color of the neighboring pixels and the current pixel being printed, nor do they take into account the characteristics of different printers in calculating the absorption error.

Other examples include the *Method And System for Enhancing The Quality Of Both Color And Black And White Images Produced By Ink Jet And Electrophotographic Printers* of Chan et al. (U.S. Pat. No. 5,111,302) has a system for reducing undesirable color contrast or "graininess" in ink jet and electrophotographic printers by assigning differing loading variations, addressed from a grey table, to a pixel to be printed according to pixel values of an image.

The *Method And Apparatus For Imbedding Controlled Structure For Gray Scale Rendering* of Tai (U.S. Pat. No. 5,260,807) discloses an apparatus for providing stable dots and spreading out information over a cell for better resolution and reproduction of gray scales. The apparatus uses a full dot process to form dots to their maximum allowable dot size at high priority pixels before beginning formation of dots for the next highest priority pixels, a partial dot process for providing a dot of the same size for each pixel in a cell before building a dot at any particular pixel to the next larger size, or a mixed dot process which combines the full and partial dot processes.

The *High Speed Digital Error Diffusion Process For Continuous Tone Image-To-Binary Image Conversion* of Ghaderi (U.S. Pat. No. 5,172,247) discloses an error diffusion process which utilizes a look-up table to reduce the amount of time required to perform calculations for the error diffusion process.

Each of these references endeavors to improve the error diffusion process. I have noticed however, that none of these endeavors adequately addresses the problem of absorption error with respect to the color of the current pixel being printed relative to its neighboring pixels, nor do they take into account the characteristics of different printers in calculating absorption error.

It also seems to me that in conventional ink jet printers, every pixel is printed in a larger size than is ideal, and that this causes overlap between a current pixel and one or more of its neighboring pixels. Therefore, when a picture image is printed, the brightness becomes darker and color variation partially occurs. Ideally, the absorption of a printed pixel is 255, while the absorption of a pixel that is not printed is zero. When brightness and color vary however, the absorption of a printed pixel is between 50–1200 (with the actual value differing according to the color of the current pixel and its neighboring pixel), and the absorption of a pixel that is not printed is zero. It is my opinion that since the errors are very large in comparison with an ideally printed picture image and the errors differ according to the color of the neighboring pixel, these errors should be considered when a pixel is processed. I have also observed that the calculated result may vary with the printer type and resolution; nevertheless, the aforementioned disadvantages occur in conventional ink jet printers because pixels are processed on the basis of an ideal picture image without consideration of diversity between printer characteristics.

SUMMARY OF THE INVENTION

It is therefore one object of the present invention to provide an improved error diffusion process and circuit.

It is another object to provide a process and circuit capable of compensating for ink bleed and overlap of color between a neighboring pixel and a current pixel.

It is still another object to provide a process and circuit for compensating for printing characteristics of a printer.

It is yet another object to provide a process and circuit capable of easily compensating for output characteristics of a printer by using only a color template and a scanner.

These and other objects may be achieved according to one aspect of the present invention, with an error diffusion circuit provided for a color image printer having a circuit for generating R-G-B (red-green-blue) signals by scanning documents and converting the R-G-B signals into C-M-Y (cyan-magenta-yellow) signals. This error diffusion circuit may be constructed with a color determining stage adding the C-M-Y signals to a diffusion error to generate a current pixel value, comparing the current pixel value with sequentially supplied error look-up data to determine an address of the error look-up data having the smallest error as output pixel color information, and applying the output pixel color information to the printer. An error storage memory stores the smallest error of the errors calculated from the color determining stage as an error for a current pixel, reads out the stored error when a next pixel is processed, and provides the read error as neighboring pixel error information to the color determining stage to generate the diffusion error, while a neighboring pixel color information storage memory stores the output pixel color information as neighboring pixel color information of the next pixel. An error look-up table stores error values generated when printing an input pixel according to the output pixel color information and provides the error values as error look-up data to the color determining stage. The error look-up table is accessed with the neighboring pixel color information.

Preferably, the error look-up data is obtained by using the brightness difference between the brightness of a current white pixel and the brightness of that current pixel when that pixel is another color, by scanning each of a plurality of color chips. These color chips exist in proportion to a number of printing samples of a first neighboring pixel, a second neighboring pixel and a current pixel. Printable colors of the second neighboring pixel vary along the axis of the abscissa with pixel groups of red, green, blue, cyan, magenta, yellow, black and white, printable colors of the first neighboring pixel vary along the ordinate axis with pixel groups of red, green, blue, cyan, magenta, yellow, black and white, and printable colors of the current pixel have one color out of a color group of red, green, blue, cyan, magenta, yellow, black and white in one template.

Preferably, the error look-up table has first, second and current pixel areas each storing error values generated on an input pixel during printing of red, green, blue, cyan, magenta, yellow, black and white, and each printing error value storage area of red, green, blue, cyan, magenta, yellow, black and white within the first pixel area is classified into the second pixel area, each printing error value storage area of red, green, blue, cyan, magenta, yellow, black and white within said second pixel area is classified into the current pixel area.

According to another aspect of the present invention, an adaptive error diffusion process is provided for a color image printer having an error look-up table for storing a plurality of colors that can be determined as an output pixel of a current pixel value. In this process, an input pixel is converted from R-G-B (red-green-blue) into C-M-Y (cyan magenta-yellow) signals, the C-M-Y signals are added to a diffusion error to generate a current pixel value, the current pixel value is compared with a sequentially supplied error look-up data value to determine an address of error look-up data having the smallest error between two values as output pixel color information, and the output pixel color information is applied to the printer. The smallest error out of errors calculated from the color determining stage is stored as an error for a current pixel, in order to provide the smallest error as neighboring pixel error information when a next pixel is processed to generate the diffusion error. The output pixel color information is stored to be used as the neighboring pixel color information when the next pixel is processed.

Preferably, the error look-up data is obtained by using the brightness difference between a current white pixel and the brightness of the current pixel when the current pixel is another color by scanning each of a plurality of color chips. These color chips exist in proportion to a number of printing samples of a first neighboring pixel, a second neighboring pixel and a current pixel. Printable colors of the second neighboring pixel vary along the axis of the abscissa with pixel groups of red, green, blue, cyan, magenta, yellow, black and white, printable colors of the first neighboring pixel vary along the ordinate axis with pixel groups of red, green, blue, cyan, magenta, yellow, black and white, and printable colors of the current pixel have one color out of a color group of red, green, blue, cyan, magenta, yellow, black and white in one template.

Preferably, error values are stored in an error look-up table having first, second and current pixel areas each storing error values generated on an input pixel during printing of red, green, blue, cyan, magenta, yellow, black and white. Each printing error value storage area of red, green, blue, cyan, magenta, yellow, black and white within said first pixel area is classified into the second pixel area, and each printing error value storage area of red, green, blue, cyan, magenta, yellow, black and white within the second pixel area is classified into the current pixel area.

The above and other objects, features and advantages of the present invention will become readily apparat from the ensuing detailed description of an illustrative embodiment of the invention which is to be read in connection with the accompanying drawings.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
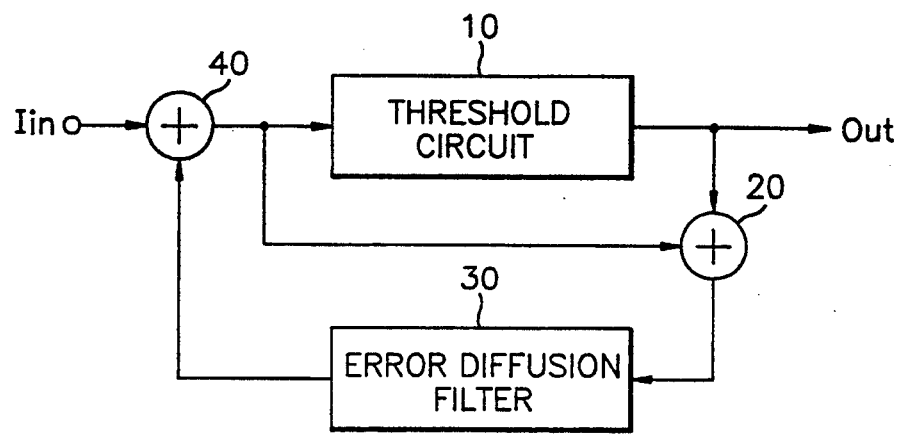
FIG. 1 is a block diagram of a conventional error diffusion circuit.

Turning now to the drawings, FIG. 1 shows a conventional error diffusion circuit. A video signal applied to input terminal line Iin is added to the output of an error diffusion filter 30 at a first adder 40. The first value generated from the first adder 40 is applied to a threshold circuit 10. The output of the threshold circuit 10 and the first value are added in a second adder 20. A second value generated from the second adder 20 is the error value; the error value is applied to error diffusion filter 30. This error diffusion circuit exhibits good intermediate tones in a monochromatic image. I have observed that it is difficult however, to reproduce an original color image in an ink jet or electrophotographic type color printer, because the characteristics of the printer are not considered by currently available error diffusion circuits and processed. That is, the color image may be dark and discolored as a result of ink bleed and color overlap between a neighboring pixel and a current pixel.

Figure 4A:
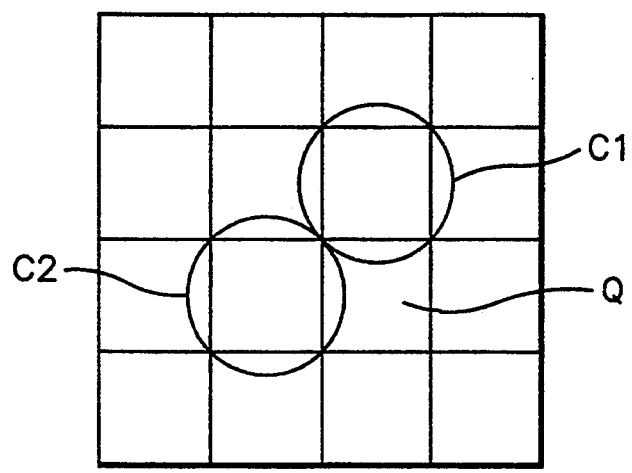
FIG. 4A shows the relationship between a neighboring pixel and a current pixel when a color is not printed.
Figure 4B:
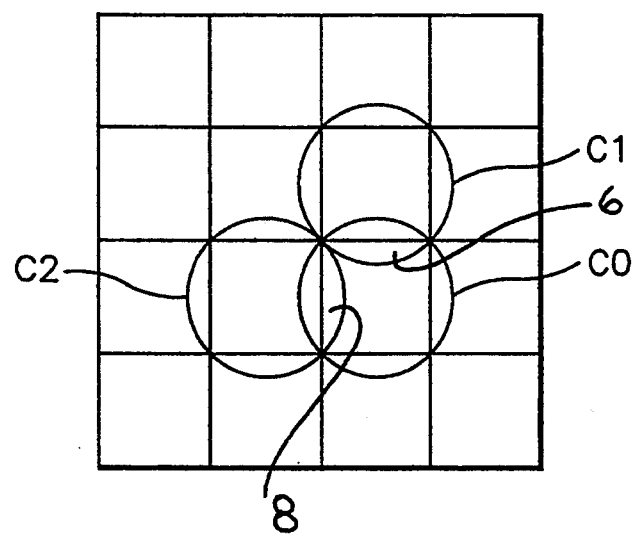
FIG. 4B shows the relationship between a neighboring pixel and a current pixel when a color is printed.

In a conventional ink jet printer, every pixel is printed in a larger size than the ideal case, and overlap between neighboring pixels C1 and C2 and a current pixel C0 occurs as is indicated in sectors 6 and 8 of FIG. 4B of the accompanying diagrammatic drawings. Therefore, when a picture image is printed, the brightness becomes darker and color variation partially occurs. Within the areas where the sectors of the neighboring pixels are superimposing over the area of the current pixel. Ideally, the absorption of a printed pixel is 255, as shown as C0 in FIG. 4B, and the absorption of a pixel not printed is zero, as shown as Q in FIG. 4A. When brightness and color vary however, the absorption of a printed pixel is between 50-1200 (differing according to the color of the neighboring pixel and current pixel), and the absorption of a pixel not printed is 0. Since these errors are very large in comparison with the ideal case and differ according to the color of the neighboring pixel, the errors should be considered when the pixel is processed. The calculated result may and I have observed, frequently does vary with the printer type and resolution. Nevertheless, in conventional ink jet printers the pixel is processed on the basis of the ideal case without considering the printer characteristic, thus, less than ideal quality color images are printed.

Figure 2:
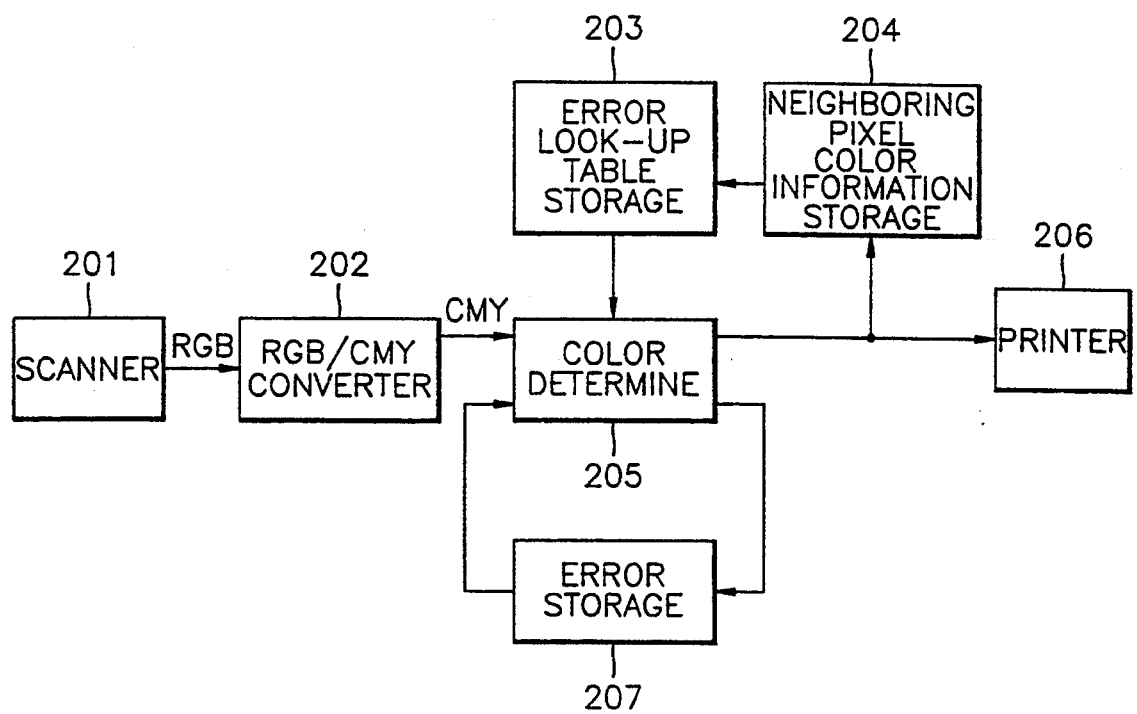
FIG. 2 is a block diagram showing one example of an adaptive color error diffusion circuit constructed according to the principles of the present invention.

Referring now to FIG. 2, a scanner 201 scans documents and successively generates R-G-B (red-green-blue) signals for each input pixel. The R-G-B signals are converted into C-M-Y (cyan-magenta-yellow) signals in an RGB/CMY converter 202. A color determining stage 205 adds the C-M-Y signals to a signal indicative of diffusion error in order to generate a current pixel value. Color determining stage 205 then compares the current pixel value with a sequentially supplied error look-up data value to determine output pixel color information as the address of the error look-up data having the smallest error between the two values. Output pixel color information is provided to a printer 206.

An error storage portion 207 stores the smallest error out of all of the errors calculated from color determining stage 205 as a current pixel error. When processing the next successive pixel, error storage portion 207 reads out the stored error and provides it as a neighboring pixel error to color determining portion 205 to generate the diffusion error. Neighboring pixel color information storage portion 204 stores the determined output pixel color information determined by color determination stage 205 as neighboring pixel color information of the next pixel to be processed. An error look-up table 203 is accessed with the neighboring pixel color information; error lookup table 203 stores error values which can be generated when printing an input pixel according to the output pixel color information. The error values stored in lookup table 203 are provided to color determining stage 205 as the error look-up data.

Figure 3:
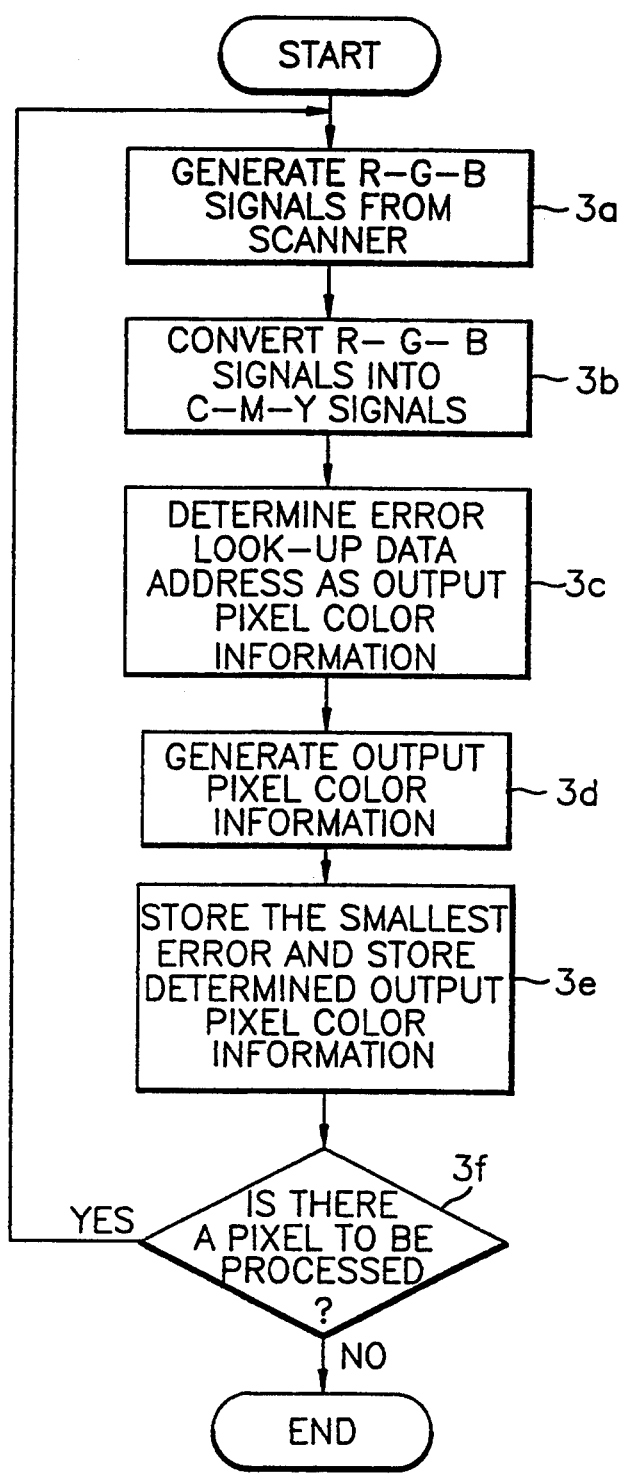
FIG. 3 is a flow chart showing one example of an adaptive color error diffusion operation constructed according to the principles of the present invention.

Referring now to FIG. 3, at step 3a, scanner 201 reads documents and converts the input pixel into R-G-B signals. The R-G-B signals are expressed with 256 ($=2^8$) gray scale levels. The R-G-B signals are suitable for additive color mixtures widely used in peripherals such as visual display units and cathode ray tube or plasma monitors. In a recording unit such as a printer, however, subtractive color mixture is primarily used; therefore, C-M-Y signals are suitable. At step 3b, the RGB/CMY converter 202 converts the R-G-B signals received from the scanner 201 into C-M-Y signals which are useful for the subtractive color mixture primarily used in color printers. The C-M-Y signals are applied to color determining stage 205. At steps 3c and 3d, the color determining portion 205 calculates the diffusion error from the neighboring pixel error information provided from error storage portion 207 and generates the current pixel value by adding the diffusion error to the C-M-Y signals. The current pixel value is compared with the sequentially supplied error look-up data, and the address of the error look-up data having the smallest error is determined as the output pixel color information to be applied to printer 206.

Figures 5, 7:
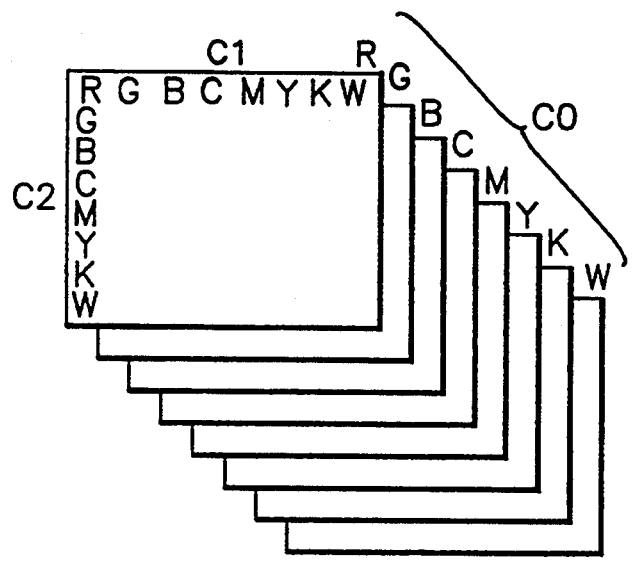
FIG. 5 shows an example of a color template in an embodiment of the present invention.
FIG. 7 shows a window and a weighing factor used in an example of an error diffusion process performed according to the principles of present invention.

The error look-up table is configured as follows. The error look-up data stored in error look-up table 203 includes the absorption error generated when a corresponding color of red, green, blue, cyan, magenta, yellow, black or white is printed on a current pixel position Q, as is shown in FIG. 4A. A color template for obtaining the compensation information after plotting the pixel at position Q, as is shown in FIG. 4B, is made as is shown in FIG. 5. Referring now to FIG. 5, the color of a second neighboring pixel C1 varies along the axis of the abscissa and the color of a first neighboring pixel C2 varies along the ordinate of the axis. Them is one color template for each possible color of a current pixel C0. In each template, since the second neighboring pixel C1 and the first neighboring pixel C2 each have eight colors, there are sixty-four color chips. Moreover, since the current pixel C0 has eight color possibilities, eight templates are provided. Accordingly, five hundred and twelve ($=64 \times 8$) color chips are made.

Figure 6A:
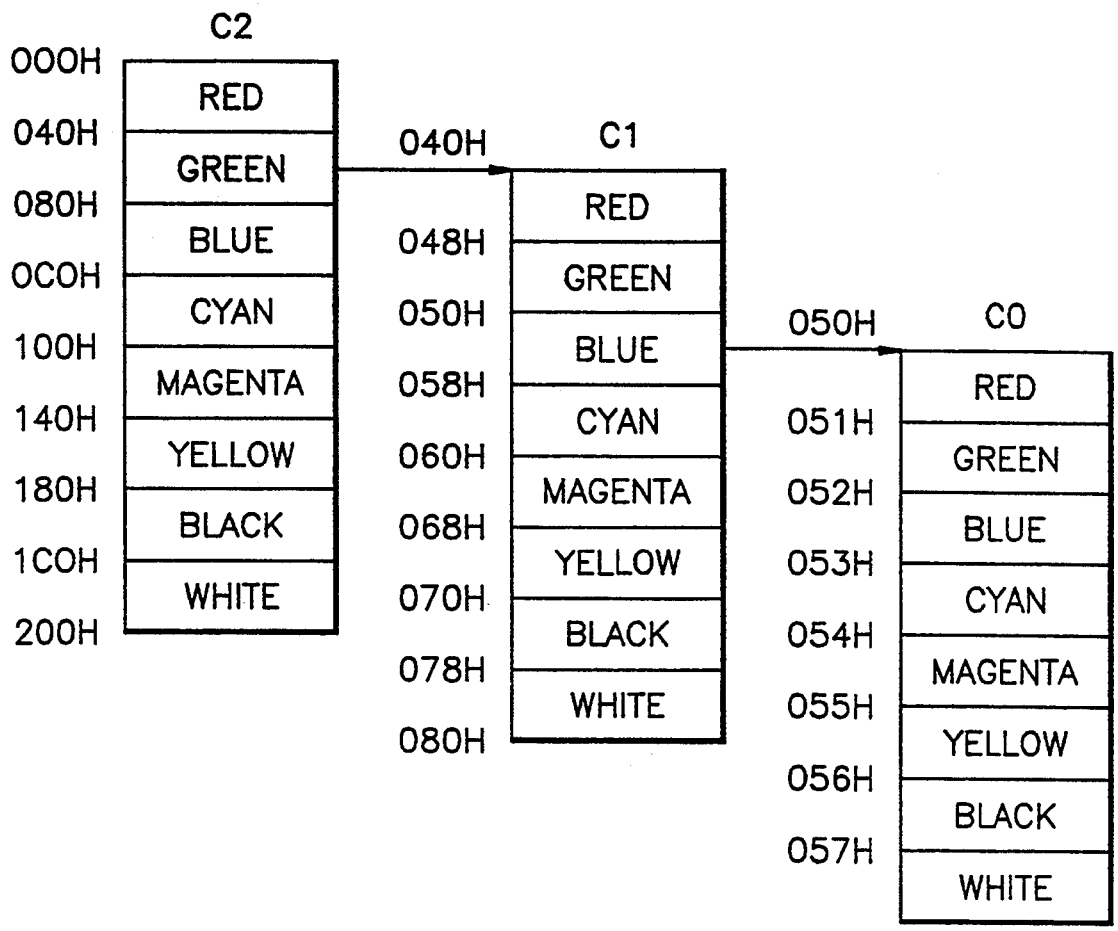
FIG. 6A shows a memory map of an error look-up table.

To compensate for absorption error with respect to the color of the neighboring pixels and the current pixel being printed, and the characteristics of different printers, each template is read through scanner 201. Thereafter, an error value is obtained by calculating the brightness difference when the current pixel C0 is white and when it is another color. That is, since when the current pixel C0 is not being printed with white ink, the absorption error is obtained by calculating the difference of brightness when the current pixel C0 is either red, green, blue, cyan, magenta, yellow, black or white. The obtained absorption error is supplied as the error look-up data and a memory map shown in FIG. 6A is made from the absorption error. If the color information of the neighboring pixels C1 and C2 is provided, the absorption errors for the current pixel C0 of eight colors can be continuously read. In this illustrative scheme, the error look-up table needs five hundred and twelve memory areas.

Returning now to FIG. 3, at step 3e, the error storage memory 207 stores the smallest error out of the errors calculated from color determining stage 205 as the current pixel error, and provides it to color determining stage 205 as neighboring pixel error information to be used when a next pixel is processed. The number of neighboring pixels considered during an error diffusion process is twelve as shown in FIG. 7, where Iin is an input pixel. Referring again to the *Digital Halftoning* article, the number of pixels and a weighing factor may differ from those of FIG. 7.

Meanwhile, the neighboring pixel color information memory 204 stores the output pixel color information determined from the color determining stage 205 as the neighboring pixel color information of the next pixel to be processed. The neighboring pixel color information is provided as an address to error look-up table 203. Since the printer 206 is capable of expressing eight colors of red, green, blue, cyan, magenta, yellow, black and white, values from zero to seven are assigned to each respective color to be used as the address.

For example, when a color is not printed on the current pixel position Q, as shown in FIG. 4A, if there are first and second neighboring pixels C2 and C1, first and second neighboring pixel color information is applied to the error look-up table 204. Since a printing operation is sequentially implemented from the upper side to the lower side and from left to right, it will be readily appreciated that the neighboring pixels are positioned at the upper and left side of the current pixel, as is shown in FIGS. 4A and 4B. Although the color bleed shown in FIG. 4A or 4B does not occur, the conventional exemplary diagrams may be used to explain this pointing sequence.

Figure 6B:
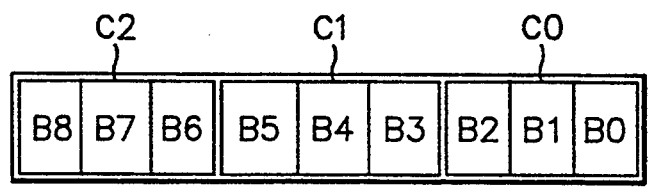
FIG. 6B shows an address field assigning format.

The addressing scheme for accessing the error look-up table shown in FIG. 6A is constructed as shown in FIG. 6B. The first neighboring pixel color information is assigned to the ninth (B8), eighth (B7) and seventh (B6) bits of an address field; the second neighboring pixel color information is assigned to the sixth (B5), fifth (B4) and fourth (B3) bits of the address field; and the output pixel information for the current pixel is assigned to the third (B2), second (BI) and first (B0) bits of the address field. For example, if green is printed on the first neighboring pixel C2 and blue is printed on the second neighboring pixel C1, areas from 40H to 79H are accessed by the first neighboring pixel color information and areas from 50H to 57H are accessed by the second neighboring pixel color information. In the areas accessed by the second neighboring pixel color information, the error look-up data, i.e. the absorption error for 8 colors which can be determined as the output pixel of the current pixel, is stored.

The diffusion error added to the C-M-Y signals in color determining portion 205 is obtained by multiplying the error value of each neighboring pixel by a weighing factor, a value calculated by adding the respective multiplied values for the neighboring pixels and dividing by forty-eight. The number forty-eight is the value obtained by adding all the weighing factors. Each neighboring pixel also has an error generated during binarization and this error is stored in the error storage memory 207.

At step 3f, as is shown in FIG. 3, it is determined whether there is a pixel to be processed. If the error diffusion operation for all the pixels is not ended, step 3f returns to step 3a. Otherwise, the entire series of the above steps are terminated.

As described above, the ink bleed and the overlap of color between a neighboring pixel and a current pixel and the output characteristic of the picture can be easily compensated simply by using the color template and scanner, thereby eliminating any need for a complicated color calibrator. Moreover, the simple configuration of the error look-up table provides a simplified structure for the system.

While a preferred embodiment of the invention is shown and described, it will be understood by those skilled in the art that foregoing and other changes in form and details may be made without departing from the spirit and scope of the present invention.

Embodiments of the invention may receive input color signals (either R-G-B or C-M-Y or other color signals) from a source other than a document scanner. For example, the input color signals may be generated directly by computer graphics or design software.

What is claimed is:

1. An error diffusion circuit for a color image printer having a circuit for generating red-green-blue signals by scanning documents and converting said red-green-blue signals into cyan-magenta-yellow signals, said error diffusion circuit comprising:

color determining means for adding said cyan-magenta-yellow signals to a diffusion error to generate a current pixel value, comparing said current pixel value with sequentially supplied error look-up data value to determine an address of error look-up data having a smallest error as output pixel color information, and applying said output pixel color information to said printer;

error storage means for storing the smallest error out of errors calculated from said color determining means as an error for a current pixel, reading out the stored error when a next pixel is processed, and providing the mad error as neighboring pixel error information to said color determining means to generate said diffusion error;

neighboring pixel color information storage means for storing said output pixel color information as neighboring pixel color information of the next pixel; and error look-up table storage means for storing error values generated when printing an input pixel according to said output pixel color information and providing said error values as said error look-up data to said color determining means, said error look-up table storage means being accessed by said neighboring pixel color information.

2. The error diffusion circuit as claimed in claim 1, wherein said error look-up data is obtained by calculating the brightness difference when a current pixel is white and when said current pixel is another color by scanning each of a plurality of color chips, said number of color chips being proportional to a number of printing samples of a first neighboring pixel, a second neighboring pixel and a current pixel, a printable color of said second neighboring pixel varying along an abscissa of each color template out of a plurality of color templates with pixel groups of red, green, blue, cyan, magenta, yellow, black and white, a printable color of said first neighboring pixel varying along the ordinate of each said color template out of said plurality of color templates with pixel groups of red, green, blue, cyan, magenta, yellow, black and white, and a printable color of said current pixel having one color out of red, green, blue, cyan, magenta, yellow, black and white in each of said plurality of said color templates.

3. The error diffusion circuit as claimed in claim 1, wherein said error look-up table storage means has first, second and current pixel areas each for storing error values generated on an input pixel during printing of red, green, blue, cyan, magenta, yellow, black and white, each printing error value storage area of red, green, blue, cyan, magenta, yellow, black and white within said first pixel area being classified into said second pixel area, each printing error value storage area of red, green, blue, cyan, magenta, yellow, black and white within said second pixel area being classified into said current pixel area.

4. An adaptive error diffusion method for a color image printer having an error look-up table for storing a plurality of colors which can be determined as an output pixel of a current pixel value, said method comprising the steps of:
  converting an input pixel from red-green-blue into cyan magenta-yellow signals, adding said cyan-magenta-yellow signals to a diffusion error to generate a current pixel value, comparing said current pixel value with a sequentially supplied error look-up data value to determine an address of error look-up data having the smallest error between said current pixel value and said sequentially supplied error look-up data value as output pixel color information, and applying said output pixel color information to said printer;
  storing the smallest error out of errors calculated from said color determining means as an error for a current pixel in order to provide said smallest error as neighboring pixel error information when a next pixel is processed so as to generate said diffusion error; and
  storing said output pixel color information as the neighboring pixel color information when the next pixel is processed.

5. The error diffusion method as claimed in claim 4, wherein said error lookup data is obtained by the brightness difference between a current white pixel and when said current pixel is another color by scanning each of a plurality of color chips, said plurality of color chips being proportional in number to a number of printing samples of a first neighboring pixel, a second neighboring pixel and a current pixel, a printable color of said second neighboring pixel varying along the abscissa of each color template out of a plurality of color templates with pixel groups of red, green, blue, cyan, magenta, yellow, black and white, a printable color of said first neighboring pixel varying along the ordinate of each said color template out of said plurality of color templates with pixel groups of red, green, blue, cyan, magenta, yellow, black and white, and a printable color of said current pixel having one color out of red, green, blue, cyan, magenta, yellow, black and white in each of said plurality of said color templates.

6. The error diffusion method as claimed in claim 4, wherein error values are stored by an error look-up table storage means which has first, second and current pixel areas each storing error values generated on an input pixel during printing of red, green, blue, cyan, magenta, yellow, black and white, each printing error value storage area of red, green, blue, cyan, magenta, yellow, black and white within said first pixel area being classified into said second pixel area, each printing error value storage area of red, green, blue, cyan, magenta, yellow, black and white within said second pixel area being classified into said current pixel area.

7. An error diffusion circuit for a printer for printing images comprised of pixels, comprising:
  means for receiving signals representative of characteristics of colors in images borne by documents;
  error storage means for generating a diffusion error value;
  an error look-up table storage means for storing an error look-up table and sequentially supplying error look-up data values from said error look-up table;
  color determining means for providing output pixel color information values for current pixels based on said signals representative of characteristics of colors, said diffusion error value generated from said error storage means and said sequentially supplied error look-up data values supplied by said error look-up table storage means; and
  neighboring pixel color information storage means for storing said output pixel color information value and using said output pixel color information values to address said error look-up data values stored in said error look-up table storage means.

8. An error diffusion circuit for a printer as recited in claim 7, further comprised of said error look-up table comprising a first plurality of color templates, with each of said color template corresponding to a different one of each of a first plurality of possible colors represented by said output pixel color information value, each of said color templates having absorption error values comprising said error look-up data values for each of a second plurality of possible colors of a first pixel neighboring said current pixel, and each of a third plurality of possible color of a second pixel neighboring said current pixel.

9. An error look-up table as recited in claim 7, further comprised of said error look-up table comprising a first plurality of templates corresponding to different colors, each of said color templates comprising absorption error values as said error look-up data values for a second plurality of possible colors of a first pixel neighboring said current pixel and a third plurality of possible colors of a second pixel neighboring said current pixel.

10. An error look-up table as recited in claim 9, further comprised of said error look-up table comprising a multiplicity of values equal in number to a product of said second plurality and said third plurality and representative of errors in aborption values corresponding to a printer producing color images in dependence upon said output pixel color information values, with said absorption values depending upon colors of said first pixel neighboring said current pixel and said second pixel neighboring said current pixel.

11. An error look-up table as defined by claim 7, further comprised of conversion means receiving red, green and blue signals obtained from said colors in said images borne by said documents, and for providing said signals representative of color characteristics by converting said red, green and blue signals into cyan, yellow and magenta signals.

12. An error look-up table as defined by claim 8, farther comprised of conversion means receiving red, green and blue signals obtained from said colors in said images borne by said documents, and for providing said signals representative of color characteristics by converting said red, green and blue signals into cyan, yellow and magenta signals.

13. An error look-up table as defined by claim 9, further comprised of conversion means receiving red, green and blue signals obtained from said colors in said images borne by said documents, and for providing said signals representative of color characteristics by converting said red, green and blue signals into cyan, yellow and magenta signals.

14. An error diffusion circuit for a printer for printing images made of pixels, comprising:

- conversion means for receiving said red-green-blue signals generated by scanning images borne by documents and converting said red-green-blue signals to cyan-yellow-magenta signals;
- error storage means for generating a diffusion error value;
- an error look-up table storage means for storing an error look-up table and sequentially supplying error look-up data values;
- color determining means for providing output pixel color information values to said printer, based on said cyan-yellow-magenta signals generated from said converter means, said diffusion error value generated from said error storage means and said sequentially supplied error look-up data values supplied by said error look-up table storage means; said error look-up table comprising a multiplicity of values equal in number to a product of said second plurality and said third plurality and representative of errors in aborption values corresponding to a printer producting color images in dependence upon said output pixel color information values, with said absorption values depending upon colors of said first pixel neighboring said current pixel and said second pixel neighboring said current pixel; and
- neighboring pixel color information storage means for storing said output pixel color information value and providing said output pixel color information value to said error look-up table storage means.

15. An error diffusion circuit for a printer as recited in claim 14, further comprised of said error look-up table comprising a plurality of color templates, one for each possible color of said output pixel color information value, each of said color templates having absorption error values as said error look-up data values for each possible color of a first neighboring pixel and each possible color of a second neighboring pixel.

16. An error look-up table as recited in claim 14, further comprised of said error look-up table comprises eight color templates, each of said eight color templates having absorption error values as said error look-up data values for eight possible colors of a first neighboring pixel and eight possible colors of a second neighboring pixel.

17. An error look-up table as recited in claim 14, further comprised of said error look-up table comprising eight color templates, each of said eight color templates having sixty-four absorption error values.

* * * * *